United States Patent [19]

Jennings, Jr. et al.

[11] Patent Number: 4,817,717
[45] Date of Patent: Apr. 4, 1989

[54] HYDRAULIC FRACTURING WITH A REFRACTORY PROPPANT FOR SAND CONTROL

[75] Inventors: Alfred R. Jennings, Jr.; Lawrence R. Stowe, both of Plano, Tex.

[73] Assignee: Mobil Oil Corporation, New York, N.Y.

[21] Appl. No.: 138,175

[22] Filed: Dec. 28, 1987

[51] Int. Cl.$^4$ .................... E21B 43/04; E21B 43/24; E21B 43/267; E21B 43/27
[52] U.S. Cl. .................... 166/278; 166/272; 166/280; 166/307
[58] Field of Search .............. 166/280, 278, 276, 259, 166/271, 272, 307, 308

[56] References Cited

U.S. PATENT DOCUMENTS

| | | | |
|---|---|---|---|
| 2,814,347 | 11/1957 | MacKnight | 166/278 |
| 2,946,382 | 7/1960 | Tek et al. | 166/259 |
| 3,227,211 | 1/1966 | Gilchrist | 166/259 |
| 4,160,483 | 7/1979 | Thomas | 166/280 X |
| 4,549,608 | 10/1985 | Stowe et al. | 166/280 |
| 4,668,643 | 5/1987 | Kida et al. | 166/280 X |

Primary Examiner—Stephen J. Novosad
Attorney, Agent, or Firm—Alexander J. McKillop; Michael G. Gilman; Charles A. Malone

[57] ABSTRACT

A process for hydraulic fracturing where a fracturing fluid contains a clay stabilizing agent. Said agent stabilizes clay particles or fines along the face of a resulting formation fracture. Thereafter a fused refractory proppant is injected into the fracture. The proppant increases thermal conductivity during a steam-flooding oil recovery method while controlling clay particles and sand.

14 Claims, 1 Drawing Sheet

HYDRAULIC FRACTURING WITH A REFRACTORY PROPPANT FOR SAND CONTROL

FIELD OF THE INVENTION

This invention relates to a method of completing a well that penetrates a subterranean formation and more particularly, relates to a well completion technique for controlling the production of sand from a formation where high temperatures are encountered.

BACKGROUND OF THE INVENTION

In the completion of wells drilled into the earth, a string of casing is normally run into the well and a cement slurry is flowed into the annulus between the casing string and the wall of the well. The cement slurry is allowed to set and form a cement sheath which bonds the string of casing to the wall of the well. Perforations are provided through the casing and cement sheath adjacent the subsurface formation.

Fluids, such as oil or gas, are produced through these perforations into the well. These produced fluids may carry entrained therein sand, particularly when the subsurface formation is an unconsolidated formation. Produced sand is undesirable for many reasons. It is abrasive to components found within the well, such as tubing, pumps, and valves, and must be removed from the produced fluids at the surface. Further, the produced sand may partially or completely clog the well, substantially inhibiting production, thereby making necessary an expensive workover. In addition, the sand flowing from the subsurface formation may leave therein a cavity which may result in caving of the formation and collapse of the casing.

In order to limit sand production, various techniques have been employed for preventing formation sands from entering the production stream. One such technique, commonly termed "gravel packing", involves the forming of a gravel pack in the well adjacent the entire portion of the formation exposed to the well to form a gravel filter. In a cased perforated well, the gravel may be placed inside the casing adjacent the perforations to form an inside-the-casing gravel pack or may be placed outside the casing and adjacent the formation or may be placed both inside and outside the casing. Various such conventional gravel packing techniques are described in U.S. Pat. Nos. 3,434,540; 3,708,013; 3,756,318; and 3,983,941. Such conventional gravel packing techniques have generally been successful in controlling the flow of sand from the formation into the well.

In U.S. Pat. No. 4,378,845, there is disclosed a special hydraulic fracturing technique which incorporates the gravel packing sand into the fracturing fluid. Normal hydraulic fracturing techniques include injecting a fracturing fluid ("frac fluid") under pressure into the surrounding formation, permitting the well to remain shut in long enough to allow decomposition or "break-back" of the cross-linked gel of the fracturing fluid, and removing the fracturing fluid to thereby stimulate production from the well. Such a fracturing method is effective at placing well sorted sand in vertically oriented fractures. The preferred sand for use in the fracturing fluid is the same sand which would have been selected, as described above, for constructing a gravel pack in the subject pay zone in accordance with prior art techniques. Normally, 20-40 mesh sand will be used; however, depending upon the nature of the particular formation to be subjected to the present treatment, 40-60 or 10-20 mesh sand may be used in the fracturing fluid.

The fracturing sand will be deposited around the outer surface of the borehole casing so that it covers and overlaps each borehole casing perforation. More particularly, at the fracture-borehole casing interface, the sand fill will cover and exceed the width of the casing perforations, and cover and exceed the vertical height of each perforation set. Care is also exercised to ensure that the fracturing sand deposited as the sand fill within the vertical fracture does not wash out during the flow-back and production steps. After completion of the fracturing treatment, fracture closure due to compressive earth stresses holds the fracturing sand in place.

In most reservoirs, a fracturing treatment employing 40-60 mesh gravel pack sand, as in U.S. Pat. No. 4,378,845, will prevent the migration of formation sands into the wellbore. However, in unconsolidated or loosely consolidated formations, such as a low resistivity oil or gas reservoir, clay particles or fines are also present and are attached to the formation sand grains. These clay particles or fines, sometimes called reservoir sands as distinguished from the larger diameter or coarser formation sands, are generally less than 0.1 millimeter in diameter and can comprise as much as 50% or more of the total reservoir components. Such a significant amount of clay particles or fines, being significantly smaller than the gravel packing sand, can migrate into and plug up the gravel packing sand, thereby inhibiting oil or gas production from the reservoir.

A hydraulic fracturing method employing a special sand control technique was disclosed in U.S. Pat. No. 4,549,608. The fracturing fluid utilized contained an agent for stabilizing clay particles or fines along a fracture face. A proppant comprised of gravel packing sand was injected into the fracture. The sand utilized was not suitable for use in certain acid and high temperature environments encountered in some formations.

Therefore, what is needed is a novel sand control method for use in producing an unconsolidated or loosely consolidated oil or gas reservoir which comprises a hydraulic fracturing method that stabilizes the clay particles or fines along the fracture face and which also creates a very fine refractory gravel pack along the length of such fracture face.

SUMMARY OF THE INVENTION

A sand control method is provided for use in a borehole having an unconsolidated or loosely consolidated oil or gas reservoir which is otherwise likely to introduce substantial amounts of sand into the borehole. The borehole casing is perforated through the reservoir at preselected intervals. The reservoir is hydraulically fractured by injecting a fracturing fluid through the casing perforations containing a clay stabilizing agent for stabilizing the clay particles or fines along the resulting formation fracture for the entire length of the fracture face so that they adhere to the formation sand grains and don't migrate into the fracture during oil or gas production from the reservoir. A proppant containing a fine mesh refractory gravel pack material is injected into the formed fracture. Hydrocarbonaceous fluids are then produced from the reservoir through said fracture.

The fracturing fluid is injected at a volume and rate to allow the stabilizing agent to penetrate the fracture face to a depth sufficient to overcome the effects of fluid velocity increases in oil or gas production flow or the movement of clay particles or fines located near the fracture face into the fracture as such production flow linearly approaches the fracture face.

Another finer mesh refractory material may also be included in the fracturing fluid. During hydraulic fracturing, the finer mesh refractory material is pushed up against the fracture face to produce a very fine mesh refractory gravel filter for preventing the migration of clay particles or fines from the reservoir into the fracture, which can plug said gravel pack material, which is thereafter injected into the fracture. Preferably, the finer mesh refractory material is about 100 mesh while the gravel packing refractory material is about 40-60 mesh.

In another aspect, a refractory gravel pack may be added inside the casing prior to production to assure the extension of gravel packing material into the fracture since the fracture step has brought the fracture right up to the casing perforations.

It is therefore an object of this invention to provide a novel proppant to be used in a fracture to allow for increased heat transfer into a formation when a thermal oil recovery operation is utilized.

It is a further object of this invention to provide for a novel proppant which is stable in the formation when high temperatures are generated from a formation via a thermal oil recovery method.

It is yet a further object of this invention to provide for a novel proppant which will prolong the life and effectiveness of a created fracture.

DESCRIPTION OF THE PREFERRED EMBODIMENT

Figure 1:
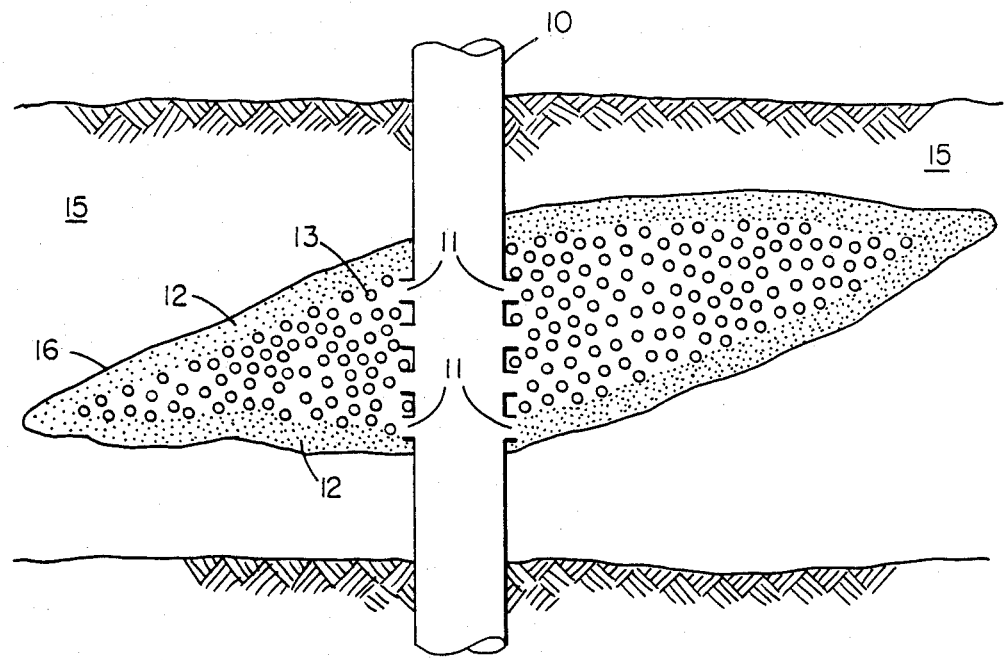
FIG. 1 is a diagrammatic view of a foreshortened, perforated well casing at a location within an unconsolidated or loosely consolidated formation, illustrating vertical perforations, vertical fractures, and fracturing sands which have been injected into the formation to create the vertical fractures in accordance with the method of the present invention.

In FIG. 1, a foreshortened borehole casing, designated generally as 10, is illustrated which is disposed within a loosely consolidated or unconsolidated formation 15. The borehole casing 10 may be a conventional perforatable borehole casing, such as, for example, a cement sheathed, metal-lined borehole casing.

The next step in the performance of the preferred embodiment method is the perforating of casing 10 to provide a plurality of perforations at preselected intervals therealong. Such perforations should, at each level, comprise two sets of perforations which are simultaneously formed on opposite sides of the borehole casing. These perforations should have diameters between ¼ and ¾ of an inch, be placed in line, and be substantially parallel to t he longitudinal axis of the borehole casing.

In order to produce the desired in-line perforation, a conventional perforation gun should be properly loaded and fired simultaneously to produce all of the perforations within the formation zone to be fractured. Proper alignment of the perforations should be achieved by equally spacing an appropriate number of charges on opposite sides of a single gun. The length of the gun should be equal to the thickness of the interval to be perforated. Azimuthal orientation of the charges at firing is not critical, since the initial fracture produced through the present method will leave the wellbore in the plane of the perforations. If this orientation is different from the preferred one, the fracture can be expected to bend smoothly into the preferred orientation within a few feet from the wellbore. This bending around of the fracture should not interfere with the characteristics of the completed well.

Following casing perforation, the formation is fractured in accordance with the method of the present invention to control sand production during oil or gas production. When fracturing with the method taught in U.S. Pat. No. 4,378,845, oil or gas production inflow will be linear into the fracture as opposed to radial into the well casing. This patent is incorporated by reference. From a fluid flow standpoint, there is a certain production fluid velocity required to carry fines toward the fracture face. Those fines located a few feet away from the fracture face will be left undisturbed during production since the fluid velocity at the distance from the fracture face is not sufficient to move the fines. However, fluid velocity increases as it linearly approaches the fracture and eventually is sufficient to move fines located near the fracture face into the fracture. It is, therefore, a specific feature of the present invention to stabilize such fines near the fracture faces to make sure they adhere to the formation sand grains and don't move into the fracture as fluid velocity increases. Prior stabilization producers have only been concerned with radial production flow into the well casing which would plug the perforations in the casing. Consequently, stabilization was only needed within a few feet around the well casing. In an unconsolidated sand formation, such fines can be 30%-50% or more of the total formation constituency, which can pose quite a sand control problem. Stabilization is, therefore, needed at a sufficient distance from the fracture face along the entire fracture line so that as the fluid velocity increases toward the fracture there won't be a sand control problem.

Figure 2:
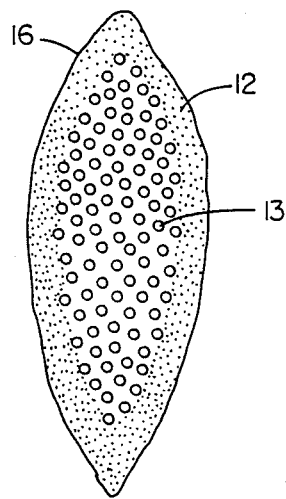
FIG. 2 is a cross-sectional end view of the reservoir fracture of FIG. 1.

A brief description of the fracturing treatment of the invention will now be set forth. Initially, a fracture fluid containing an organic clay stabilizing agent is injected through the well casing perforations 10 into the formation 11, as shown in FIG. 1. Such a stabilizing agent adheres the clay particles or fines to the coarser sand grains. In the same fracturing fluid injection, or in a second injection step, a very small mesh fused refractory material, such as 100 mesh, is injected. As fracturing continues, the small mesh fused refractory material, will be pushed up against the fractured formation's face 16 to form a layer 12. Thereafter, a proppant injection step fills the fracture with a larger mesh fused refractory material, preferably 40-60 mesh to form a layer 13. A cross-sectional end view of the reservoir fracture is shown in FIG. 2. It has been conventional practice to use such a 40-60 mesh sand for gravel packing. However, for low resistivity unconsolidated or loosely consolidated sands, a conventional 40-60 mesh gravel pack will not hold out the fines. The combination of a 100 mesh fused refractory material layer up against the fracture face and the 4014 60 proppant fused refractory material layer makes a very fine grain gravel filter that will hold out such fines.

As oil or gas production is carried out from the reservoir, the 100 mesh fused refractory material layer will be held against the formation face by the 40–60 mesh proppant layer and won't be displaced, thereby providing for such a very fine grain gravel filter at the formation face. Fluid injection with the 40–60 mesh proppant fills the fracture and a point of screen out is reached at which the proppant comes all the way up to and fills the perforations in the well casing. The fracturing treatment of the invention is now completed and oil or gas production may now be carried out with improved sand control. Prior to production, however, it might be further advantageous for sand control purposes to carry out a conventional inside the casing gravel pack step. Such a conventional gravel pack step is assured of extending the packing material right into the fracture because the fracturing step has brought the fracture right up to the well casing perforations. A propping agent or fused refractory gravel concentration of about one pound per gallon to about fifteen pounds per gallon can be used. A more detailed description of a field operation wherein sand is employed as proppant is disclosed in U.S. Pat. No. 4,549,608 which issued on Oct. 29, 1985. This patent is hereby incorporated by reference herein.

Following the fracturing treatment, a conventional gravel pack was placed in and immediately surrounding the well casing to hold the 40–60 mesh sand in place and the well was opened to oil or gas flow from the reservoir.

The desired fused refractory material to be utilized herein comprises silicon carbide or silicon nitride. As is preferred, the size of the fused refractory material utilized should be from about 20 to about 100 U.S. Sieve. This fused refractory material should have a Mohs hardness of about 9. Both silicon carbide and silicon nitride have excellent thermal conductivity. Silicon nitride, for example, has a thermal conductivity of about 10.83 BTU/in/sq. ft/hr./°F. at 400° to 2400° F. A suitable silicon carbide material is sold under the trademark Crystolon and can be purchased from Norton Company, Metals Division, Newton, Mass. A suitable silicon nitride material can also be purchased from Norton Company.

This novel proppant is particularly advantageous when a thermal process is utilized during the recovery of hydrocarbonaceous fluids from a formation. One thermal recovery process which can be utilized comprises a steam-flood. A thermal oil recovery process wherein steam is utilized to remove viscous oil from a formation which can be employed herein is described in U.S. Pat. No. 4,598,770. This patent issued to Shu et al. on July 8, 1986 and is hereby incorporated by reference. Another thermal oil recovery method wherein steam is utilized which can be employed herein is described in U.S. Pat. No. 4,593,759. It issued to Penick on June 10, 1986 and is hereby incorporated by reference. Walton describes yet another thermal oil recovery process which can be used to recover hydrocarbonaceous fluids in U.S. Pat. 3,205,944. This patent issued on Sept. 14, 1965 and is hereby incorporated by reference. By this method hydrocarbons within the formation are auto-oxidized. Auto-oxidation occurs at a relatively low rate and the exothermic heat of reaction heats up the formation by a slow release of heat. Since during auto-oxidation, the temperature within the formation can be the ignition temperature of the hydrocarbon material within said formation, the auto-oxidation reaction is controlled to prevent combustion of the hydrocarbon material within the formation.

Heat generated by either of these methods is more effectively transferred into the formation via the fused refractory material used as a proppant herein. Since the fused refractory material used as a proppant herein allows for a more efficient transfer of heat into the formation, smaller volumes of steam can be utilized, for example, in a steam-flood process. Similarly, when using the auto-oxidation method to heat a formation, decreased amounts of oxygen can be used to obtain the same degree of heating within the formation. Once the formation has been heated to the desired degree, increased volumes of hydrocarbonaceous fluids can more effectively be produced to the surface from the formation.

In addition to providing high thermal conductivity, the proppant and fine refractory material used herein can also withstand acids used in treating a well and/or formation, including HCl/HF acid mixtures. The proppant and fine refractory material also provide for high fracture conductivity, acid stability, and high temperature stability when use in formations containing these environments. As will be understood by those skilled in the art, HCl/HF acid mixtures are often used when clearing channels in the formation and hear the well to increase the production of hydrocarbonaceous fluids after sand and clay materials have reduced flow through said channels.

The proppant material used herein could also be manufactured in a desired shape to cause it to bridge and remain in place within a created fracture. Using a shape required for a particular fracture would permit the proppant to more effectively prop the formation. It would also allow the proppant to withstand greater formation pressures while in a fracture.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed is:

1. A sand control and heat transfer method for use in a borehole having an unconsolidated or loosely consolidated oil or gas reservoir which is otherwise likely to introduce substantial amounts of sand into the borehole, comprising:
  (a) providing a borehole casing through said reservoir;
  (b) perforating said casing at preselected intervals therealong to form at least one set of longitudinal, in-line perforations;
  (c) hydraulically fracturing said reservoir by injecting a fracturing fluid containing a fine grain fused refractory material which comprises substantially silicon carbide or silicon nitride, and a clay stabilizing agent through said perforations at a volume and rate sufficient to allow said stabilizing agent to penetrate the fracture face along its entire length at a depth sufficient to overcome the effects of fluid velocity increases in oil or gas production flow on the movement of clay particles or fines located near the fracture face into the fracture as production flow linearly approaches said fracture face;
  (d) injecting a proppant comprising a gravel packing fused refractory material comprised substantially of silicon carbide or silicon nitride into said fracture so that said gravel packing material pushes said fine grain refractory material up against the face of the fractured reservoir, whereby a first layer of fine grain fused refractory material is held in place along the entire face of said fracture by a second layer of gravel packing fused refractory material also extending along the entire length of said fracture thereby excluding fines; and (e) producing oil or gas from said reservoir through said fracture into said borehole casing via a thermal oil recovery method which proppant and layers provide for increased heat transfer into said formation.

2. The method of claim 1 wherein said fine grain fused refractory material is no larger than about 100 mesh.

3. The method of claim 2 wherein said gravel packing is 40–60 mesh.

4. The method of claim 1 wherein said fine grain fused refractory material is a mixture of particles, the largest being about 40–60 mesh.

5. The method as recited in claim 1 where oil and gas are produced from said reservoir by a steam flood oil recovery process.

6. The method as recited in claim 1 where a HCl/HF acid mixture is used to clear channels in the formation and well once the flow therethrough has been reduced.

7. A sand control and heat transfer method for use in a borehole having an unconsolidated or loosely consolidated oil or gas reservoir which is otherwise likely to introduce substantial amounts of sand into the borehole, comprising:

(a) providing a borehole casing through said unconsolidated or loosely consolidated oil or gas reservoir;

(b) perforating said casing at preselected intervals therealong to form at least one set of longitudinal, in-line perforations;

(c) hydraulically fracturing said reservoir by injecting a fracturing fluid through said perforations;

(d) injecting a clay stabilizing agent into the face of the resulting reservoir fracture along the entire length of the fracture at a rate sufficient to pentrate the fracture face along its entire length to minimize the movement of clay particles or fines from the reservoir into the fracture under the influence of oil or gas fluid velocity increase as such fluid linearly approaches the fractures along its entire length during production;

(e) injecting a fine grain substantially silicon nitride or silicon carbide material no larger than about 100 mesh into said fracture and forcing said fine grain material up against the face of the fractured reservoir to form a first filter layer along the entire length of the fracture;

(f) injecting a gravel packing substantially silicon nitride or silicon carbide material into said fracture to form a second filter layer for holding said first filter layer in place along the face of the fracture, the combination of said first filter layer of said fine grain material up against the face of the fracture and said second filter layer of said gravel packing material up against the fine grain sand provides a two-layer gravel filter that prevents both clay particles or fines and formation sands from mitrating from said reservoir during oil or gas production from said reservoir;

(g) reducing the rate of injection of said gravel packing material after the propagation of the fracture has been completed and continuing such reduced rate of injection until screen out has occurred; and (h) producing oil or gas from said reservoir via a thermal oil recovery which proppant and layers provide for increased heat transfer into said formation.

8. The method as recited in claim 7 wherein said gravel packing material is about 40–60 mesh.

9. The method as recited in claim 7 where oil and gas are produced from said reservoir by a steam flood oil recovery process.

10. The method as recited in claim 7 where a HCl/HF acid mixture is used to clear channels in the formation and well once the flow therethrough has been reduced.

11. A sand control and heat transfer method for use in a borehole having an unconsolidated or loosely consolidated oil or gas reservoir which is otherwise likely to introduce substantial amounts of sand into the borehole, comprising:

(a) providing a borehole casing through said unconsolidated or loosely consolidated oil or gas reservoir;

(b) perforating said casing at preselected intervals therealong to form at least one set of longitudinal, in-line perforations;

(c) hydraulically fracturing said reservoir by injecting a fracturing fluid containing a clay stabilizing agent through said perforations, said clay stabilizing agent pentrates the reservoir to minimize the movement of clay particles or fines from the reservoir into the resulting fracture under the influence of oil or gas fluid flow during production;

(d) injecting a proppant comprising a gravel packing fused refractory material into said fracture which material comprises substantially silicon carbide or silicon nitride;

(e) forming a first gravel layer of fused refractory material up against the face of the resulting formation fracture along its entire length which material comprises substantially silicon carbide or silicon nitride;

(f) forming a second gravel layer of fused refractory material comprised substantially of silicon carbide or silicon nitride up against said first gravel layer along the entire length of the face of said fracture and completely filling said fracture up to said well casing with said second gravel layer, the grain size of said first gravel layer being much finer than the grain size of said second gravel layer to prevent the plugging of said second gravel layer with clay particles or fines which would otherwise move from said reservoir into said fracture and plug up said second gravel layer under the sweeping influence of oil or gas flow from said reservoir into said fracture during production, and (g) producing said reservoir through said well casing via a thermal oil recovery method which proppant and layers provide for increased heat transfer into said formation.

12. The method of claim 11 further comprising the step of providing an inside the casing gravel pack prior to the step of producing said reservoir, such a gravel packing step assures the extension of the packing material into the fracture since the fracturing step has brought the fracture right up to the well casing perforations.

13. The method as recited in claim 11 where oil and gas are produced from said reservoir by a steam flood oil recovery process.

14. The method as recited in claim 11 where a HCl/HF acid mixture is used to clear channels in the formation and well once the flow therethrough has been reduced.

* * * * *

UNITED STATES PATENT AND TRADEMARK OFFICE
CERTIFICATE OF CORRECTION

PATENT NO. : 4,817,717
DATED : April 4, 1989
INVENTOR(S) : Alfred R. Jennings et al It is certified that error appears in the above-identified patent and that said Letters Patent is hereby corrected as shown below:

Col. 4, line 33    delete "producers" and insert --procedures--
Col. 4, line 66    delete "4014 60" and insert --40-60--
Col. 5, line 41    insert --®-- after Crystolon
Col. 6, line 26    delete "hear" and insert --near--

Signed and Sealed this

Third Day of October, 1989

Attest:

DONALD J. QUIGG

*Attesting Officer*    *Commissioner of Patents and Trademarks*